(12) United States Patent
Wojciechowski

(10) Patent No.: US 6,840,265 B2
(45) Date of Patent: Jan. 11, 2005

(54) CONNECTION DEVICE AND ASSOCIATED PROCESS

(75) Inventor: Thorsten Wojciechowski, Paderborn (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 318 days.

(21) Appl. No.: 10/023,607

(22) Filed: Dec. 18, 2001

(65) Prior Publication Data

US 2002/0096938 A1 Jul. 25, 2002

(30) Foreign Application Priority Data

Dec. 19, 2000 (DE) .......................................... 100 63 471

(51) Int. Cl.⁷ .......................... F16K 31/02; F16K 43/00
(52) U.S. Cl. ............. 137/315.03; 137/884; 251/129.15; 303/119.2; 303/119.3; 335/260; 335/278
(58) Field of Search ........................ 137/315.03, 15.17, 137/15.18, 884; 251/129.15, 129.21; 303/119.1, 119.2, 119.3; 335/261, 281, 260, 278

(56) References Cited

U.S. PATENT DOCUMENTS

| | | | | |
|---|---|---|---|---|
| 3,232,312 A | * | 2/1966 | Lansky et al. ......... | 137/315.03 |
| 3,717,179 A | * | 2/1973 | Clark ..................... | 137/625.65 |
| 4,308,891 A | * | 1/1982 | Loup ..................... | 137/625.65 |
| 4,387,739 A | * | 6/1983 | Schaming ................ | 137/884 |
| 4,736,177 A | | 4/1988 | Vollmer et al. | |
| 4,889,164 A | * | 12/1989 | Hozumi et al. ............ | 137/884 |
| 4,913,189 A | * | 4/1990 | Kline et al. .................. | 137/884 |
| 4,929,038 A | * | 5/1990 | Reinartz et al. ............ | 137/884 |
| 5,048,569 A | * | 9/1991 | Stoll et al. .................. | 137/884 |
| 5,137,455 A | * | 8/1992 | Moerbe et al. ............. | 137/884 |
| 5,269,490 A | * | 12/1993 | Fujikawa et al. ........... | 137/884 |
| 5,460,350 A | * | 10/1995 | Nagashima et al. ... | 251/129.15 |
| 5,653,249 A | * | 8/1997 | Reinartz et al. ....... | 251/129.15 |
| 5,762,318 A | * | 6/1998 | Staib et al. ............ | 251/129.15 |
| 5,823,507 A | * | 10/1998 | Inden et al. ............ | 251/129.15 |
| 5,845,672 A | * | 12/1998 | Reuter et al. .......... | 251/129.15 |

FOREIGN PATENT DOCUMENTS

| | | |
|---|---|---|
| DE | 295 08 389 | 8/1995 |
| DE | 197 18 242 | 11/1998 |
| DE | 197 27 414 | 1/1999 |
| DE | 198 48 039 | 4/2000 |
| DE | 199 22 425 | 10/2000 |

OTHER PUBLICATIONS

Robert Bosch GmbH, "Directional control valves NG 6 Series D, Issue 1.0," brochure from Bosch–Automation Technology, Industrial Hydraulics, pp. 1–44.

Robert Bosch GmbH "Directional control valves NG 6 Series D, Issue 2.0," brochure from Bosch–Automation Technology, Industrial Hydraulics, pp. 1–16.

* cited by examiner

Primary Examiner—George L. Walton
(74) Attorney, Agent, or Firm—Husch & Eppenberger, LLC; Robert C. Haldiman; David A. Chambers

(57) ABSTRACT

The invention relates to a device for making contact between a solenoid and an electronic control unit arranged neighboring a valve block, wherein the solenoid projects away from a side wall of the valve block by a magnetic coil and a magnetic core, contact elements being arranged in an end face region of the solenoid facing towards the valve block in such a way that the contact elements can be directly electrically connected to corresponding contact elements arranged on a wall of the electronic control unit or of the valve block.

13 Claims, 4 Drawing Sheets

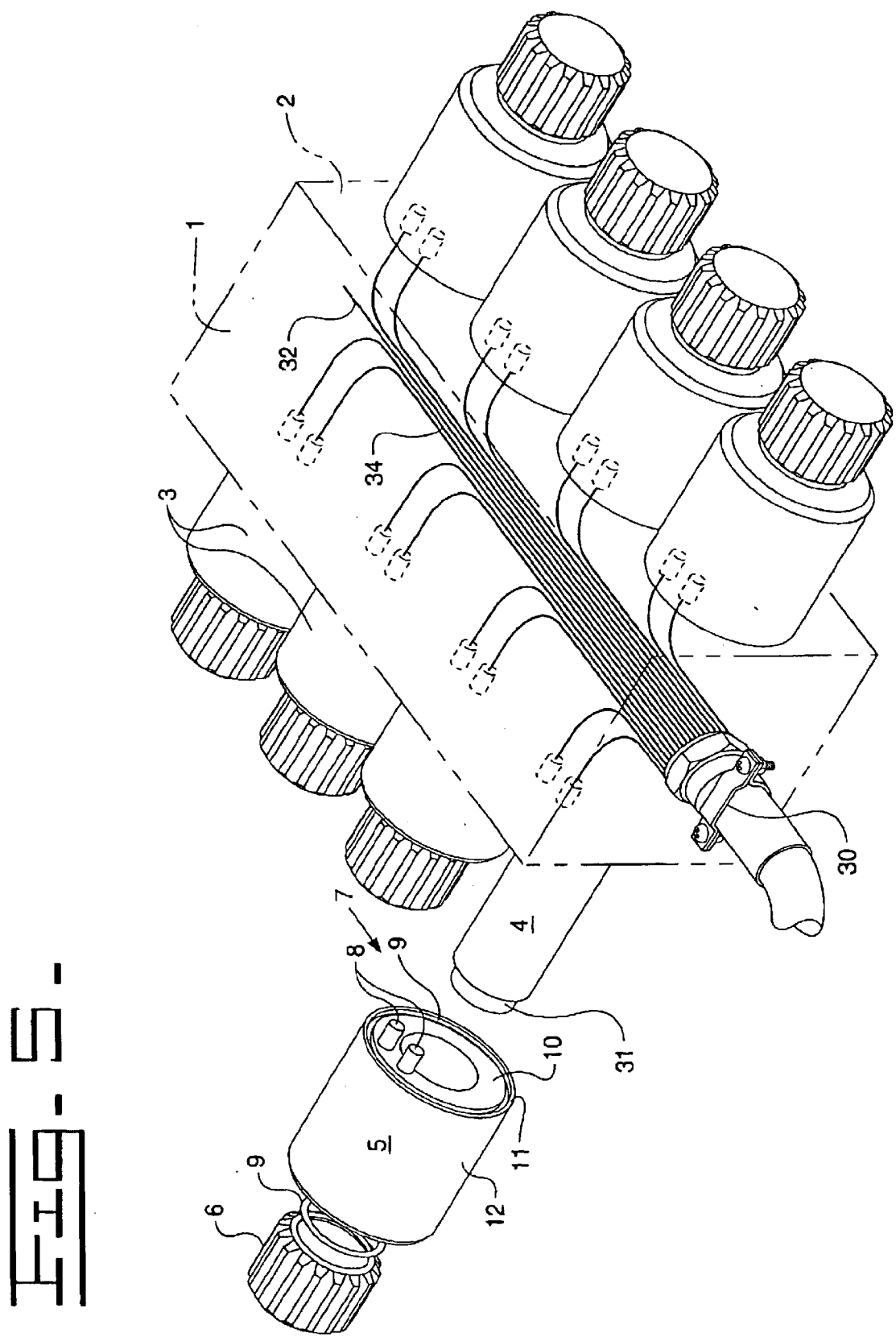

CONNECTION DEVICE AND ASSOCIATED PROCESS

BACKGROUND OF THE INVENTION

The devices that are currently available for making contact between a control unit and the electrical connections of a functional element require a significant amount of structural space.

For example, German Patent Application No. 198 48 039 A1 discloses a device for making contact between a solenoid valve and an electronic control unit that is assigned to a valve block. The solenoid valves for the control unit project away from a side wall of the valve block. Contact elements of a solenoid of the solenoid valve are arranged on a side of the solenoid valve facing away from the valve block and are connected to the electronic control unit via a connecting means. This arrangement of the electronic control unit is undesirable in devices where the solenoid valves each project away from a side wall of the valve block in opposite directions relative to one another.

A brochure from BOSCH® about NG6 series D directional control valves, issue 2.0, discloses a device for making contact between a solenoid valve and an electronic control unit for a valve block where the electronic control unit is arranged on an upper side of the valve block. Located on the circumferential side of a solenoid of the solenoid valve is an adapter where contact elements arranged on a perimeter of the solenoid are electrically coupled to contact elements of the electronic control unit. This known device has a considerable structural space requirement, the cost of making contact between the solenoid valve and the electronic control unit being relatively high. BOSCH® is a registered trademark of Robert Bosch GmbH, a corporation of the Federal Republic of Germany, having a place of business at Robert-Bosch-Platz, 1 Gerlingen, Federal Republic of Germany D-70839.

German Patent Application No. 197 27 414 A1 discloses a solenoid for a valve that has a hollow cylindrical winding support with a winding receptacle for accommodating a winding wire. Contact pins of the solenoid accessible from the outside are injected into the winding support. A disadvantage in this known solenoid is that additional electric connecting means must be provided to connect the contact pins to the ends of the winding wire.

The present invention is directed to overcoming one or more of the problems set forth above.

SUMMARY OF THE INVENTION

This present invention relates to a device for making contact between a control unit and electrical connections of a functional element such as a hydraulic valve block. The control unit preferably includes a solenoid projecting away from the functional element.

Accordingly, in a first aspect of the present invention a device for making contact between a control unit and electrical connectors of a functional element, e.g., hydraulic valve block, is disclosed where the device is structured in such a manner that the necessary space can be reduced.

In another aspect of this invention, a device for making electrical contact is disclosed. This device includes a hydraulic valve block having at least one first contact element and a control unit, having an end face region that faces towards the hydraulic valve block and at least one second contact element, wherein the at least one first contact element of the hydraulic valve block corresponds in a one-to-one relationship to the at least one second contact element of the control unit to provide a direct electrical contact when interconnected.

An advantage of the present invention includes the allowance of direct contact between the contact elements of the control unit in an end face region facing towards the functional element and the solenoid. In this manner, the device according to the present invention exhibits a compact structure. The cost for materials for making electrical contact can be considerably reduced. The basic idea of the invention is to provide as short an electrical connection pathway as possible. Due to the shortening of the electric connecting lead and the integration of the control unit into a shielded housing, unwanted interference on electric lines is largely prevented. By this means, electromagnetic compatibility can be substantially improved with the detrimental effects on the electrical conductivity of device for making electrical contact reduced. The effect of this is to prolong the service life of the device.

According to an alternative embodiment of the invention, a side wall of the functional element, e.g., hydraulic valve block, serves as the bearing surface for an end face of the control unit. The control unit is pushed onto a tubular frame projecting away from the side wall of the hydraulic valve block. Electrical contact is made between the corresponding contact elements of the solenoid and the hydraulic valve block. The solenoid is fixed mechanically on the side wall of the hydraulic valve block. Advantageously, the contact elements of the solenoid or of the hydraulic valve block serve not just for electric connection but also for the simplified mechanical linkage or connection of the solenoid to the housing of the valve block. This facilitates the fitting of the control unit onto the hydraulic valve block.

Another aspect of the contact device of the present invention is that the contact elements are constructed in the form of contact pins and receptacles in a one-to-one correspondence to the contact pins. Contact can be made by a wedged insertion of the contact pins into the respective receptacles. Advantageously, this detachable plug connection allows not only an electrical connection but also simultaneously furthers mechanical connection between the solenoid and the housing for the hydraulic valve block.

It is another aspect of the present invention which discloses a solenoid having a hollow cylindrical winding support having a winding receptacle for accommodating a winding wire, ends of the winding wire being connected to contact pins accessible from the outside of the solenoid Still another aspect of this invention is to develop a solenoid in such a way that the production costs for manufacturing the solenoid is reduced.

Another aspect of the solenoid of the present invention is that the solenoid includes contact pins that engage by an inner end into a winding receptacle, the inner end being electrically connected to an end of winding wire. There is a winding support where the circumferential side of the winding support is surrounded by a housing sleeve.

Yet another aspect of the solenoid according to the present invention is that the inner ends of contact pins in a region of the winding receptacle make direct contact between the winding receptacle and an end of the winding wire. In this manner, secure contact is made between the ends of the winding wire and the externally accessible contact pins. This simplifies matters for production.

According to a special embodiment of the solenoid, the winding support has a radial wall bounding the winding receptacle, which possesses through-holes corresponding to the contact pins so that the correct positioning of the contact pins on the winding support is permitted. To produce the solenoid, the prefabricated contact pins are inserted into the through-holes that the inner ends are arranged in a planned region of the winding receptacle. In a further step in the process, the winding wire is wound round the winding support or around the winding receptacle with ends of the winding wire coming to rest with the inner ends of the contact pins and being electrically connected to the inner ends of the contact pins by known connection methods. In this manner, simple production of the solenoid is permitted, in particular, the making of contact between ends of the winding wire and the ends of a contact pin, where the ends of the contact pins are accessible from the outside of the solenoid.

Still another aspect of the solenoid of the present invention is that the winding support is covered at an end face by a circular plate with a seal that is provided on the circumferential side between the circular plate and a housing sleeve. The housing sleeve surrounds the winding support to prevent the penetration of unwanted moisture into the interior of the solenoid. On an opposite end face of the solenoid is an additional seal, preferably an O-ring, so that the solenoid is completely sealed off. By integrating the connections in the solenoid no additional sealing is necessary.

The above aspects are merely illustrative examples of a few of the innumerable aspects associated with the present invention and should not be deemed an all-inclusive listing in any manner whatsoever.

BRIEF DESCRIPTION OF THE DRAWINGS

Reference is now made to the drawings, which illustrate the best known mode of carrying out the invention and wherein the same reference characters indicate the same or similar parts throughout the views.

FIG. 5 illustrates a perspective view of a valve block having solenoid valves arranged on opposite side walls, solenoids of the solenoid valves having contact pins projecting axially away on an end face showing

DETAILED DESCRIPTION

Figure 1:
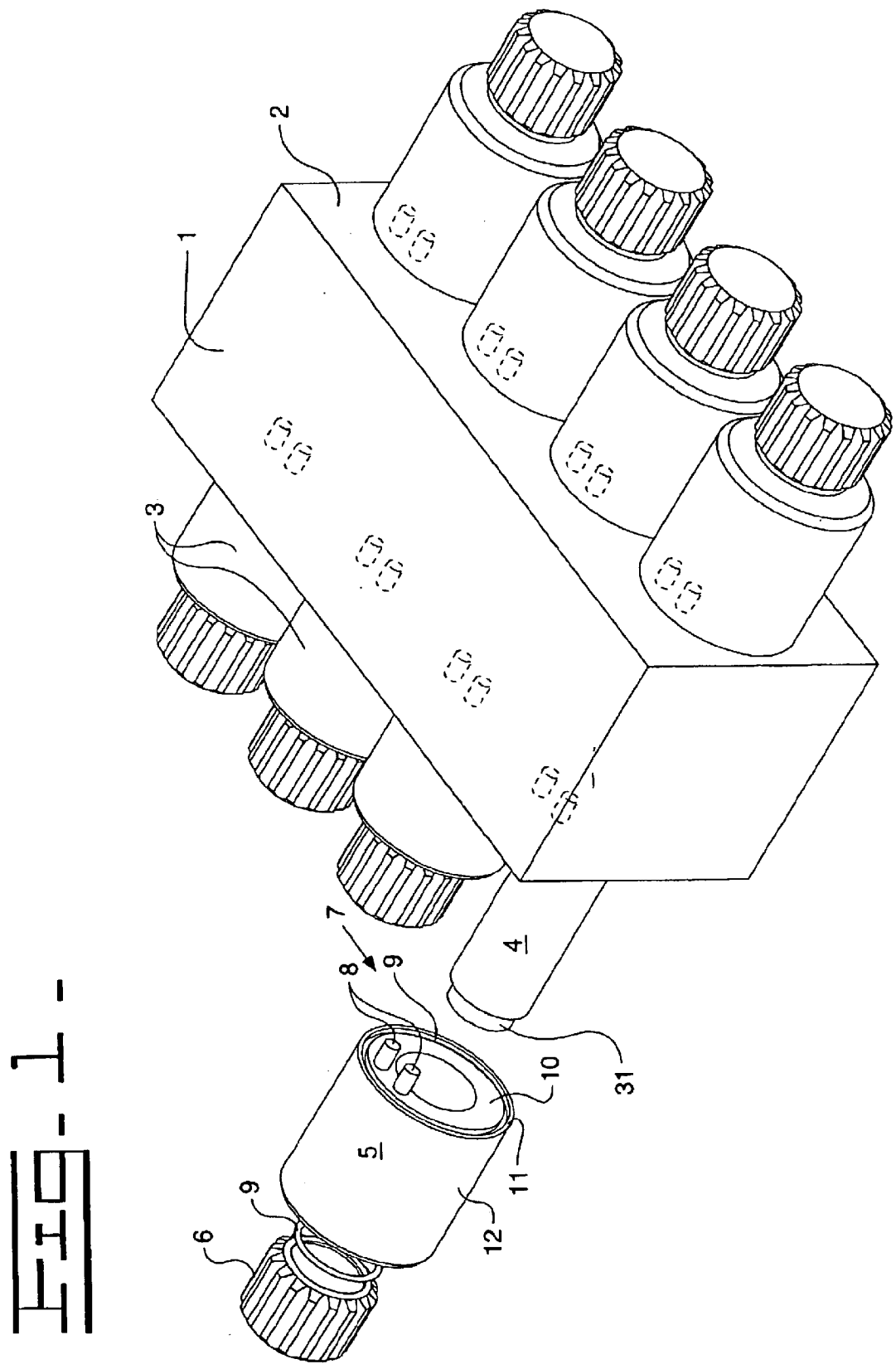
FIG. 1 illustrates a perspective view of a valve block having solenoid valves arranged on opposite side walls, solenoids of the solenoid valves having contact pins projecting axially away on an end face.

FIG. 1 shows a valve device that includes a housing 1 for a hydraulic valve block and solenoid valves 3 that are projecting away from side walls 2 of the valve block housing 1 and are preferably parallel to each other. The solenoid valves 3 are preferably arranged in rows with the two rows of opposite solenoid valves 3 lying in a common plane of extension. Although the geometric shape of the valve block housing 1 can vary tremendously, the preferred shape is that of a parallelepiped.

Contained in the valve block housing 1 are components which control the direction, the magnitude or the pressure of the volume flow of a liquid which is fed in and carried away through openings in the valve block housing 1, which are known to individuals with ordinary skill in the art and are not illustrated. The valve unit formed in this way can be employed, for example, as a directional control valve unit.

Actuation of this valve unit is accomplished through the solenoid valves 3, which are each formed substantially by a sleeve 4 accommodates and includes a displaceable magnetic core. The sleeve 4 projects away from a side wall 2 of the valve block housing 1.

There is a magnetic coil 5, which can be slid onto the sleeve 4. As shown in indicative manner in FIG. 1, the sleeve 4 has a threaded free end 30 so that after the magnetic coil 5 has been inserted over the magnetic coil 5, the sleeve 4 can be fixed against the side wall 2 of the valve block housing 1 by threadedly attaching a union nut 6 to the threaded free end of the sleeve 30.

Contact between the magnetic coil 5 of the solenoid valve 3 and an electronic control unit (not shown) is through first contact elements 8, e.g. two (2) located in an end face region 7 facing towards the valve block housing 1, which are electrically connectable to corresponding second contact elements (not shown), which are arranged on the side wall 2. The two contact elements 8 of the solenoid 5 are integrated in the valve block housing 1, which is arranged on an upper side of the valve block housing 1.

Connected to the second contact elements enclosed in the side wall 2 of the valve block housing 1 may be electric leads (not shown) leading to corresponding connections of the electronic control unit. Alternatively, the electronic control unit can also be positioned inside the valve block housing 1 in such a way that the second contact elements enclosed in the side walls 2 of the valve block housing 1 form the connectors for the electronic control unit.

The electronic control unit is preferably, but not necessarily, arranged adjoining and located within the valve block housing 1, with the preferred exemplified embodiment having the electronic control unit adjoining an upper side of the valve block housing 1. In order that the electrical connection path between the first contact elements 8 of the solenoid 5 and the second contact elements, e.g., connectors, of the electronic control unit is as short as possible, the first contact elements 8 or the corresponding second contact elements in the side walls 2 are arranged in a region close to the upper side of the valve block housing 1.

As can be seen in FIG. 1, the first contact elements 8 are preferably constructed in the form of contact pins, which can be plugged to wedge into the second contact elements in the side walls 2, which are preferably constructed in the form of receptacles. The solenoid 5 includes a first end portion and a second end portion with an annular surface 10 on the end face of the second end portion of the solenoid 5. The first contact pins 8 project out in the axial direction from the annular surface 10 on the end face of the solenoid 5 and the first contact pins 8 extend in a region close to an edge 11 of the outer wall of the solenoid 5. In this manner, the orientation of the contact pins 8 in position towards the electronic control unit is ensured.

Alternatively, the first contact pins 8 can also project out angularly in the radial direction from a casing surface 12 of the solenoid 5 so that direct connection to the electronic control unit is ensured. In this case the first contact pins would be of a hook-shaped or zigzagging construction.

Figure 2:
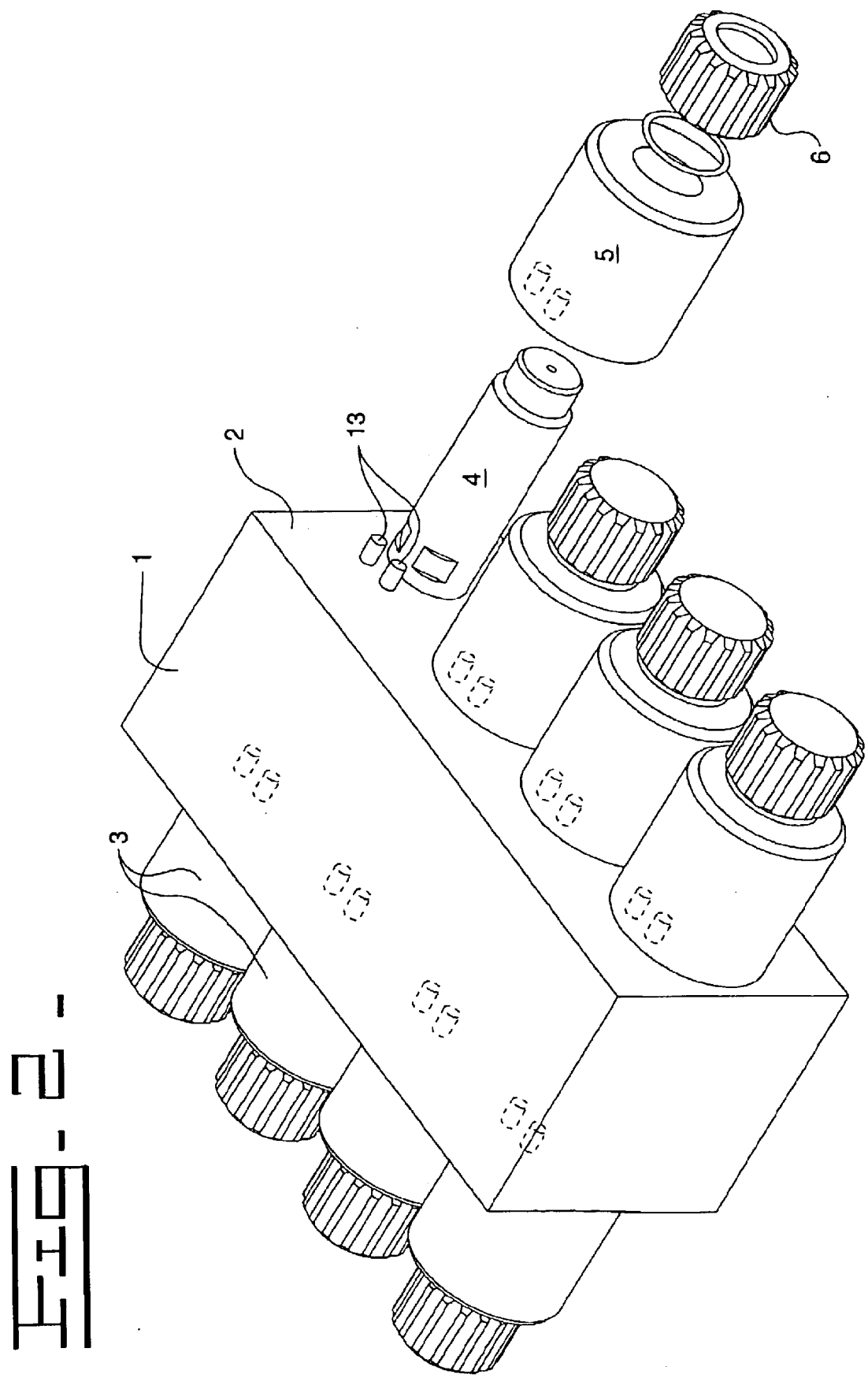
FIG. 2 illustrates a perspective view of a hydraulic valve block having solenoid valves projecting away on opposite parallel side walls, contact pins projecting away from the side wall of the hydraulic valve block for making contact between an electronic control unit integrated in a housing of the hydraulic valve block and the solenoid.

According to a first alternative embodiment shown in FIG. 2, in contrast with the embodiment according to FIG. 1, the construction of the first contact elements (not shown) of the solenoid 5 and the second contact elements 13 of the valve block housing 1 can be reversed. As FIG. 2 clearly shows, contact pins 13 can project out from the side wall 2, which engage in corresponding sleeve-like receptacles (not shown) in the solenoid 5. In this manner, the same electrical and mechanical connection of the solenoid 5 to the housing 1 is brought about as in the exemplified embodiment according to FIG. 1. Advantageously, the sleeve 4 serves as a guide when placing the solenoid 5 onto the side wall 2 of the valve block housing 1 with contact being made between the corresponding contact elements of the solenoid 5 on the one hand and of the valve block housing 1 on the other hand. This produces a mechanical connection, which facilitates the threaded attachment of the union nut 6.

Figure 3:
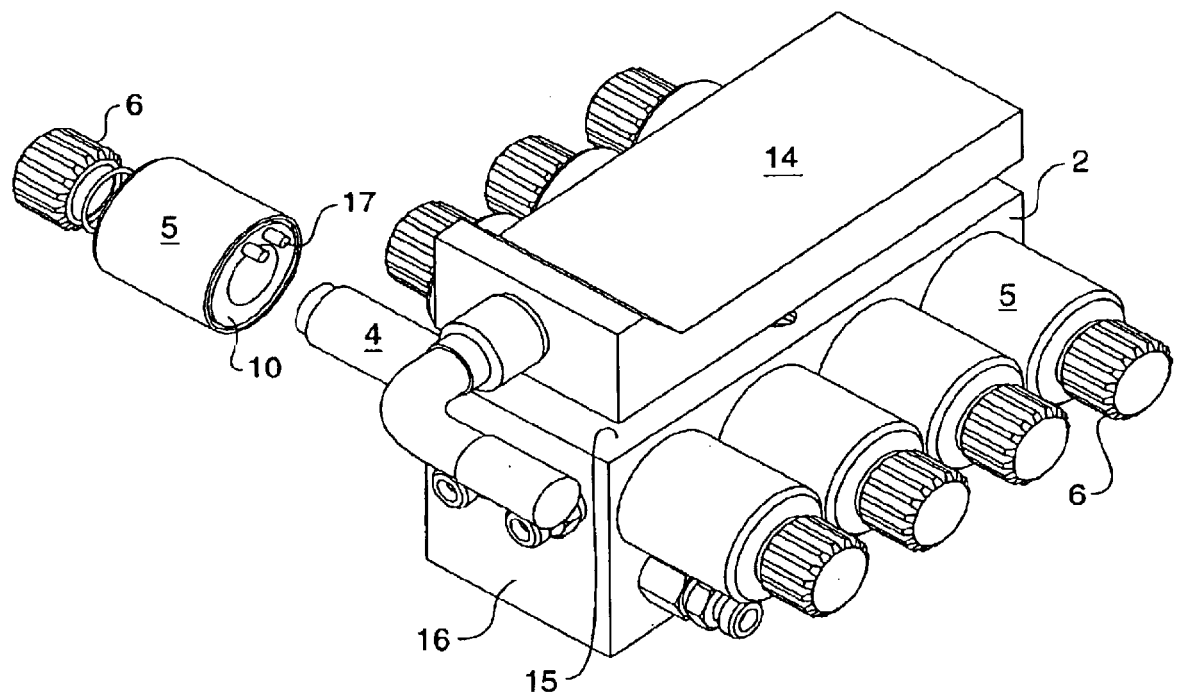
FIG. 3 illustrates a perspective view of a hydraulic valve block having solenoid valves projecting away on opposite side walls, an electronic control unit being arranged as a separate structural unit fastened on an upper side of the hydraulic valve block.

According to a second alternative embodiment shown in FIG. 3, in contrast with the preceding exemplified embodiments, the electronic control unit is constructed as a separate structural unit as indicated by numeral 14 which is arranged to be set up and fixed on an upper side 15 of a valve block housing 16. Making contact between each solenoid 5 and second connectors of the electronic control unit 14 is done in the manner described above by fitting the annular surface 10 of the solenoid 5 against the side wall 2 with engagement of first contact pins 17 in corresponding second receptacles (not shown) of the valve block 16. Other electrical connection means (which are not shown), plug connectors for example, are provided between the valve block 16 and the electronic control unit 14 so that electrical connection between the solenoid 5 and the electronic control unit 14 is ensured.

Figure 4:
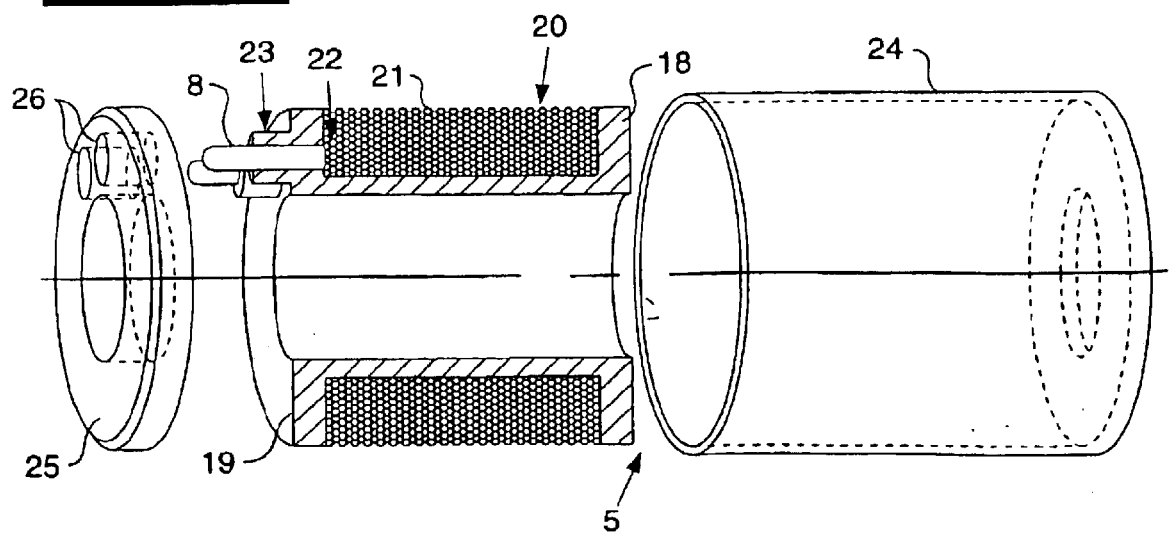
FIG. 4 illustrates an exploded view of a solenoid.

In FIG. 4, a construction for the solenoid 5 is illustrated. The solenoid 5 has a hollow cylindrical winding support 18, having end face regions, includes an annular radial wall 19 for bounding a winding receptacle 20. In the winding receptacle 20, a winding wire 21 is wound in the form of a typical layered winding, ends of the winding wire 21 each being electrically connected to an inner end 22 of the first contact pins 8 for the solenoid 5.

In order to produce the solenoid 5, each first contact pin 8 extends into through-holes 23 in a radial wall 19 until the inner end 22 of each first contact pin 8 is positioned against a point inside the winding receptacle 20. In a further step, the winding wire 21 is wound in a typical manner around the winding support 18 or into the winding receptacle 20. The end of the winding wire 21 is connected to the inner end 22 of the contact pin 8 by known connection techniques (soldering, etc.). After this step, the winding support 18 is inserted into a pot-shaped housing sleeve 24, which covers the winding support 18 on the circumferential side. For sealing closure, a circular plate 25 is provided which on the circumference has a seal 9, illustrated in FIG. 1, and this is put in place on an end face of the housing sleeve 24 to seal it against the side walls 2 of the valve block housing 1.

The contact pins 8 project outwards and pass through corresponding openings 26 in the circular plate 25. The seals 9 are arranged as O-rings at both end faces of the solenoid 5.

Alternatively, the contact elements of the valve block 1 corresponding to the first contact elements 8 of the solenoid 5 can also be connected merely via a cable run to a central plug-in unit which is not shown. The central plug-in unit can be arranged on an end face of the valve block housing 1. Preferably, the leads emanating from opposite first contact elements 8 have a common reference potential, for example, the earth leads can be brought together and then connected to the central plug-in unit via a common lead. The cable run is arranged inside the valve block 1 so that efficient cable routing with full shielding is ensured.

FIG. 5 shows the valve device that includes the housing 1 for the hydraulic valve block and solenoid valves 3 that are projecting away from the side walls 2 of the valve block housing 1 and are preferably parallel to each other. The solenoid valves 3 are preferably arranged in rows with the two rows of opposite solenoid valves 3 lying in a common plane of extension. Although the geometric shape of the valve block housing 1 can vary tremendously, the preferred shape is that of a parallelepiped.

Contained in the valve block housing 1 are components which control the direction, the magnitude or the pressure of the volume flow of a liquid which is fed in and carried away through openings in the valve block housing 1, which are known to individuals with ordinary skill in the art and are not illustrated. The valve unit formed in this way can be employed, for example, as a directional control valve unit.

Actuation of this valve unit is accomplished through the solenoid valves 3, which are each formed substantially by a sleeve 4 accommodates and includes a displaceable magnetic core. The sleeve 4 projects away from a side wall 2 of the valve block housing 1.

The magnetic coil 5 can be slid onto the sleeve 4. As shown in indicative manner in FIG. 5, contact between the magnetic coil 5 of the solenoid valve 3 and the electronic control unit (not shown) is through the first contact elements 8, e.g. two (2) located in the end face region 7 facing towards the valve block housing 1, which are electrically connectable to corresponding second contact elements (not shown), which are arranged on the side wall 2. The contact pins 8 project outwards and pass through corresponding openings 26 in the circular plate 25. The two contact elements 8 of the solenoid 5 are integrated in the valve block housing 1, which is arranged on an upper side of the valve block housing 1. The second contact elements are connected to cable runs 34. The cable runs 34 and common lead 32 are joined and grouped at the threaded free end 30.

What is claimed is:

1. A solenoid valve control assembly adapted for controlling pressure valves in a block, comprising:

at least two solenoid valves each having a magnetic core and a sleeve, said sleeve being fixed to said block;

said block having at least two integral solenoid ports and said block having at least two integral electrical pathways for signals controlling each of said solenoid valves;

at least two winding housings having a first lead and a second lead;

at least two winding housings each adapted for mounting on each of said sleeves, such that said windings are in operative communication with said magnetic cores of said solenoid valves;

each of said winding housings having a mounting face adapted to abut a mounting seat on one of said ports of said block;

each of said winding housings having a first pair of contacts, one contact of said first pair of contacts being in electrical communication with said first lead of said winding and the other contact of said pair of contacts being in electrical communication with said second lead of said winding; and each of said first pair of contacts being on said mounting face and being disposed to establish electric communication with a second pair of contacts when said winding housing is mounted on the block, said second pair of contacts being on the mounting seat.

2. The device according to claim 1, further comprising of at least one frame projecting from a side wall of the block wherein said winding housing is engaged with the frame projecting from the side wall of the block when the first pair of contacts and the second pair of contacts are electrically engaged.

3. The device according to claim 1, wherein said second pair of contacts are in electrical communication with a controller for controlling the operation of the valves supported by the block.

4. The device according to claim 1, further comprising a block having at least one side wall with the second pair of contacts located on the at least one side wall and with an electronic controller; wherein said controller controls operation of valves within the block through electric communication between said first pair of contacts and said second pair of contacts.

5. The device according to claim 4 further comprising at least one other solenoid valve control assembly and at least one other mounting seat said mounting seat having at least one third pair of contacts.

6. The device according to claim 4, wherein the controller is integrated within said block.

7. The device according to claim 4, wherein said controller is removably attached to an upper portion of said at least one side wall of the block.

8. The device according to claim 4, further including a cable run that extends between said second pair of contacts element located in the at least one side wall of the block and a central plug-in unit of the block.

9. The device according to claim 8, wherein the cable run includes cables that are connected to a common reference potential in electric communication with said second pair of contacts and with said central plug-in unit of the block.

10. The device according to claim 1, wherein said mounting face includes at least one contact pin disposed to engage a receptacle located in the mounting face.

11. The device according to claim 1, wherein said winding housing includes an open face end having a circular plate with at least one opening that corresponds to said first pair of contacts.

12. The device according to claim 11, further including a circular seal that is located between the circular plate and the winding housing.

13. The device according to claim 1 wherein said at least two solenoid valves, sleeves, magnetic cores and ports are opposing.

\* \* \* \* \*